(12) United States Patent
Zeng

(10) Patent No.: US 9,140,792 B2
(45) Date of Patent: Sep. 22, 2015

(54) SYSTEM AND METHOD FOR SENSOR BASED ENVIRONMENTAL MODEL CONSTRUCTION

(75) Inventor: Shuqing Zeng, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 86 days.

(21) Appl. No.: 13/151,064

(22) Filed: Jun. 1, 2011

(65) Prior Publication Data

US 2012/0310516 A1 Dec. 6, 2012

(51) Int. Cl.
| | |
|---|---|
| G01C 21/32 | (2006.01) |
| G01S 17/02 | (2006.01) |
| G01S 17/42 | (2006.01) |
| G01S 19/46 | (2010.01) |
| G01S 19/45 | (2010.01) |

(52) U.S. Cl.
CPC ............... *G01S 17/023* (2013.01); *G01C 21/32* (2013.01); *G01S 17/026* (2013.01); *G01S 17/42* (2013.01); *G01S 19/45* (2013.01); *G01S 19/46* (2013.01)

(58) Field of Classification Search
CPC ....... G01S 17/026; G01S 17/42; G01S 19/46; G01C 21/32
USPC ......... 701/411, 412, 426, 445, 450, 468, 469, 701/495, 514, 519, 532
See application file for complete search history.

(56) References Cited

U.S. PATENT DOCUMENTS

| | | | |
|---|---|---|---|
| 2,989,890 A * | 6/1961 | Dressler ........................ 356/389 |
| 4,671,650 A * | 6/1987 | Hirzel et al. .................... 356/28 |
| 5,416,712 A | 5/1995 | Geier et al. |
| 5,793,934 A * | 8/1998 | Bauer ........................... 700/250 |
| 6,032,098 A | 2/2000 | Takahashi et al. |
| 6,233,521 B1 * | 5/2001 | Nomura ........................ 701/461 |
| 6,366,851 B1 | 4/2002 | Chojnacki et al. |
| 6,385,539 B1 | 5/2002 | Wilson et al. |
| 6,526,352 B1 | 2/2003 | Breed et al. |

(Continued)

FOREIGN PATENT DOCUMENTS

| | | |
|---|---|---|
| CN | 101473195 A | 7/2009 |
| CN | 101641610 A | 2/2010 |

(Continued)

OTHER PUBLICATIONS

Geoffrey Blewitt, Basics of the GPS Technique: Observation Equations, Copyright 1997, Published by Swedish Land Survey in the textbook "Geodetic Applications of GPS", pp. 15-22 and 46.*

(Continued)

*Primary Examiner* — Helal A Algahaim
*Assistant Examiner* — Dale W Hilgendorf
(74) *Attorney, Agent, or Firm* — Mark S. Cohen; Pearl Cohen Zedek Latzer Baratz LLP

(57) ABSTRACT

A method and system may determine the estimated location of a vehicle, measure a location of an object relative to the vehicle using a sensor associated with the vehicle, and determine an updated vehicle location using the measured relative object location in conjunction with previously stored object locations. The estimated vehicle location may be determined using a system different from that associated with the sensor, for example a GPS system. The object location may be measured relative to a sub-map corresponding to the location of the vehicle.

20 Claims, 5 Drawing Sheets

(56) References Cited

U.S. PATENT DOCUMENTS

| | | |
|---|---|---|
| 6,768,944 B2 | 7/2004 | Breed et al. |
| 6,853,919 B2 | 2/2005 | Kellum |
| 7,102,496 B1 * | 9/2006 | Ernst et al. .................. 340/436 |
| 7,444,240 B2 | 10/2008 | Macneille et al. |
| 7,512,487 B1 | 3/2009 | Golding et al. |
| 7,647,180 B2 | 1/2010 | Breed |
| 2007/0070069 A1 * | 3/2007 | Samarasekera et al. ...... 345/427 |
| 2007/0195094 A1 * | 8/2007 | Adachi ......................... 345/467 |
| 2007/0208507 A1 * | 9/2007 | Gotoh ........................... 701/210 |
| 2007/0244640 A1 * | 10/2007 | Hirokawa .................... 701/213 |
| 2007/0250263 A1 * | 10/2007 | Yamada ....................... 701/207 |
| 2008/0240573 A1 | 10/2008 | Nakamura et al. |
| 2008/0243378 A1 * | 10/2008 | Zavoli ......................... 701/209 |
| 2009/0143125 A1 * | 6/2009 | Baudisch et al. .................. 463/9 |
| 2009/0228204 A1 * | 9/2009 | Zavoli et al. .................. 701/208 |
| 2009/0281719 A1 * | 11/2009 | Jakobson ..................... 701/201 |
| 2010/0004856 A1 * | 1/2010 | Kobori et al. ................. 701/208 |
| 2010/0061591 A1 * | 3/2010 | Okada et al. .................. 382/103 |
| 2010/0100321 A1 | 4/2010 | Koenig et al. |
| 2010/0164789 A1 | 7/2010 | Basnayake |
| 2010/0174479 A1 | 7/2010 | Golding et al. |
| 2011/0044504 A1 * | 2/2011 | Ol et al. ........................ 382/103 |
| 2011/0161032 A1 * | 6/2011 | Stahlin ............................ 702/94 |
| 2013/0002489 A1 * | 1/2013 | Erad et al. .................... 342/432 |

FOREIGN PATENT DOCUMENTS

| | | |
|---|---|---|
| CN | 101996420 A | 3/2011 |
| JP | 2006195540 A * | 7/2006 |

OTHER PUBLICATIONS

U.S. Appl. No. 13/104,220, filed May 10, 2011, Zeng, Shuqing.

Office Action CN application No. 201210178090.4 dated Jul. 25, 2014.

Office Action CN application No. 201210178090.4 dated Mar. 23, 2015.

* cited by examiner

SYSTEM AND METHOD FOR SENSOR BASED ENVIRONMENTAL MODEL CONSTRUCTION

FIELD OF THE INVENTION

The present invention is related to determining the geographic position of a vehicle using, for example, a combination of the vehicle measured location of objects, previously recorded object location data, and global positioning system (GPS) vehicle location data.

BACKGROUND

Many vehicle active safety features, and other vehicle applications, rely on accurate vehicle position data. For example, vehicle-to-vehicle and vehicle-to-infrastructure analysis, including forward collision alert, and enhanced traffic light violation alert, require an accurate vehicle position to be determined in order to properly alert the driver about potential threats. Lane departure warning, adaptive front lighting, traffic light violation alert, and lane centering, require accurate lane geometry measurements, which are based on location data such as GPS location data. Thus, the proper functioning of many vehicle active safety features is directly limited by the accuracy of the vehicle location measurement. Current GPS location methods available for non-military use are only accurate to within, in some cases, 3 meters, and GPS position accuracy may be further diminished when less than a minimum number of satellites are in view of the vehicle. As a result, the accuracy and reliability of current location methods are insufficient for many vehicle active safety features.

A method and system to enhance the accuracy of the vehicle location measurement, for example using GPS systems, is needed.

SUMMARY

A method and system may determine the estimated location of a vehicle, measure a location of an object relative to the vehicle using a sensor associated with the vehicle, and determine an updated vehicle location using the measured object location in conjunction with previously stored object locations. The estimated vehicle location may be determined using a system different from that associated with the sensor, for example a GPS system. The object location may be measured relative to a sub-map corresponding to the location of the vehicle.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
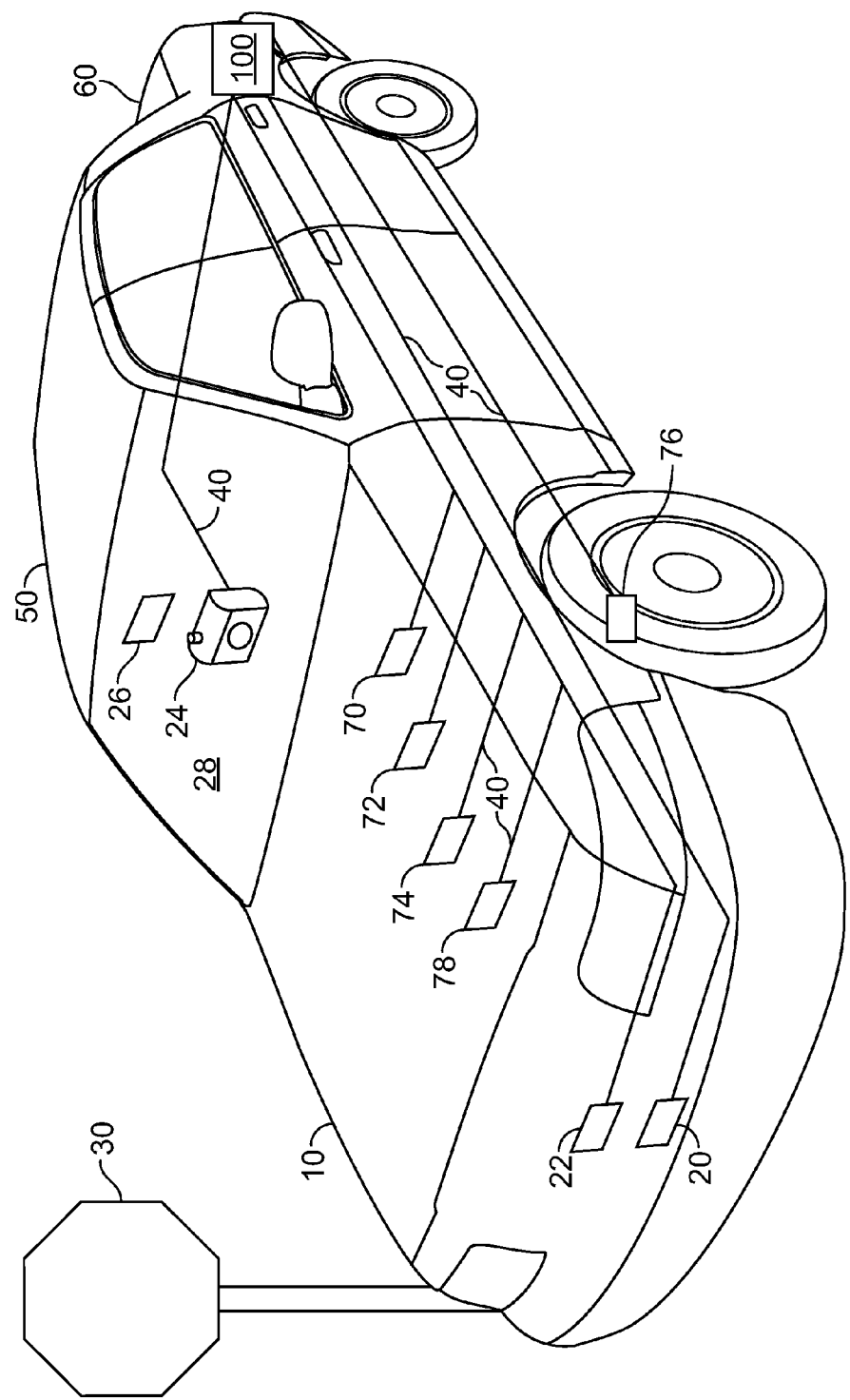
FIG. 1 is a schematic diagram of a vehicle and object location measurement method and system according to an embodiment of the present invention.

Reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. It will however be understood by those of ordinary skill in the art that the embodiments of the present invention may be practiced without these specific details. In other instances, well-known methods, procedures, components, and circuits have not been described in detail so as not to obscure the present invention.

Unless specifically stated otherwise, as apparent from the following discussions, throughout the specification discussions utilizing terms such as "processing", "computing", "storing", "determining", "evaluating", "measuring", "providing", "transferring", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may combine the location or geographic position information of a vehicle (and related information such as direction of travel, speed, acceleration, heading, yaw, etc.) and data measured by a sensor associated with the vehicle to locate or determine an absolute location of the vehicle. Initial or "gross" position data may be determined, for example, from a GPS system, which may have a limited accuracy (e.g., to 3 meters). Refined or more accurate position data may be determined by sensing the relative location of an object external to the vehicle with a known position and adjusting or modifying the initial or gross position data.

For example, a sensor which is an imager may image an object, landmark or element, determine the relative position of the object to the vehicle, landmark or element to the vehicle, and use this information to determine or refine a vehicle location. Objects, landmarks or elements sensed may be typically static elements including, but not limited to, light posts, traffic sign/lights, bridges, exit ramps, road shoulders, trees, rocks, lane markers, structures, infrastructure elements, static natural objects, or other objects. A system in the vehicle may measure or evaluate the location of objects using sensors installed in the vehicle or otherwise associated with the vehicle. Different types of sensors known to those of skill in the art may be used including, but not limited to, imagers, radar receivers, ultrasonic sensors, or light-sensing devices (e.g., LIDAR (Light Detection and Ranging) devices). The vehicle may be a motor vehicle such as a car, van, or truck, but embodiments of the invention may be used with other locomotive or non-locomotive devices. Initial location information may come from a vehicle location detection system such as GPS information, dead reckoning information (e.g., wheel speed, acceleration, yaw-rate, etc.), vehicle sensor measured relative location information, or other information. The measured location of objects and the calculated position of the vehicle may be stored in a computer or computing system installed in the vehicle, a computer not installed in the vehicle, or other storage device or medium.

In one embodiment, the geographic location of objects or landmarks is generated based on the estimated location of a vehicle and the relative location of the object with respect to the vehicle. Over several passes or trips, the accuracy of the object location is refined and increased (since, in one embodiment, the object location is derived in part from the inherently inaccurate GPS location of the vehicle). This increasingly accurate location of an object may be used, on an individual vehicle trip, to refine or make more accurate GPS information for a vehicle for that trip.

When discussed herein, the position, point of view, heading or direction, and other position and orientation data of a sensor in the vehicle is typically interchangeable with that of the vehicle. When used herein, the distance and angle from the vehicle is typically the distance and angle from the sensor, since images are captured by the sensor mounted in the vehicle. In one embodiment, boundary information relating to vehicle size may be added to position and orientation data of the sensor. The location of the sensor in, or relative to, the vehicle may therefore be taken into account.

FIG. 1 is a schematic diagram of a vehicle and object location measurement system according to an embodiment of the present invention. A vehicle 10 (e.g., an automobile, truck, or another vehicle) may include a vehicle location system 100. One or more sensor(s) may be attached to or associated with the vehicle 10. A LIDAR, or laser radar (LADAR), sensor 20, radar sensor 22, computer vision sensor (e.g., a camera) 24, imager, or other remote sensing device may obtain data allowing system 100 to determine the relative location, to the vehicle, of a static landmark or object 30 (e.g., a street sign, tree, bridge, building, structure, or other static landmark).

LIDAR sensor 20 and radar sensor 22 are preferably installed on the front or rear of vehicle but may also be installed on the sides or any other location on vehicle 10. One or more LADAR sensor(s) 20 and/or radar sensor(s) 22 may be facing or sensing generally in the direction of typical forward travel, opposite to direction of typical forward travel, or in any other orientation with respect to vehicle 10. In one embodiment, camera 24 may be forward facing (e.g., facing in the direction of typical travel), may image through windshield 28, and may be for example mounted to rear view mirror 26. Camera 24 may also be rearward facing (e.g., facing opposite the direction of typical travel). Camera 24 may also be positioned in another location, e.g. outside passenger compartment 50 and in any orientation with respect to vehicle 10. More than one camera 24 may be used, obtaining images from different points of view.

One or more sensor(s) 20, 22, 24 may transfer sensed data (e.g., images) to vehicle position system 100 via, e.g., a wire link 40 or a wireless link. More than one sensor 20, 22, 24 may be associated with the vehicle obtaining information on object locations from different points of view.

In one embodiment of the present invention, vehicle location system 100 is or includes a computing device mounted on the dashboard of the vehicle, in passenger compartment 50 or in trunk 60, and may be part of, associated with, accept location information from, or include a conventional vehicle location detection system such as a GPS. In alternate embodiments, vehicle location system 100 may be located in another part of the vehicle, may be located in multiple parts of the vehicle, or may have all or part of its functionality remotely located (e.g., in a remote server).

Each object 30 may have information stored for it (e.g., in system 100) such as for example longitude, latitude, and height or altitude. Vehicle location data may include a heading or direction of travel, and thus may include for example six numbers, such as longitude, latitude, and height or elevation and heading data, which may include three numbers. Other methods and systems for representing object location and vehicle location and/or heading may also be used.

In one embodiment of the present invention, vehicle 10 may include vehicle dynamics measurement devices. The vehicle dynamics measurement devices may include one or more inertial measurement unit(s) (IMU) 70, accelerometer(s) 72, speedometer(s) 74, wheel speed sensor(s) 76, steering direction sensor(s) 78 or other devices. The device(s) may measure vehicle dynamics data including longitudinal acceleration, lateral (i.e., angular or centripetal) acceleration, yaw-rate, speed, wheel rotation, steering direction and other vehicle dynamics characteristics of vehicle 10. The measured vehicle dynamics information may be transferred to system 100 via, for example, a wire link 40 or a wireless link. The vehicle dynamics data may be used by system 100 or another system in dead reckoning and other calculations.

Figure 2:
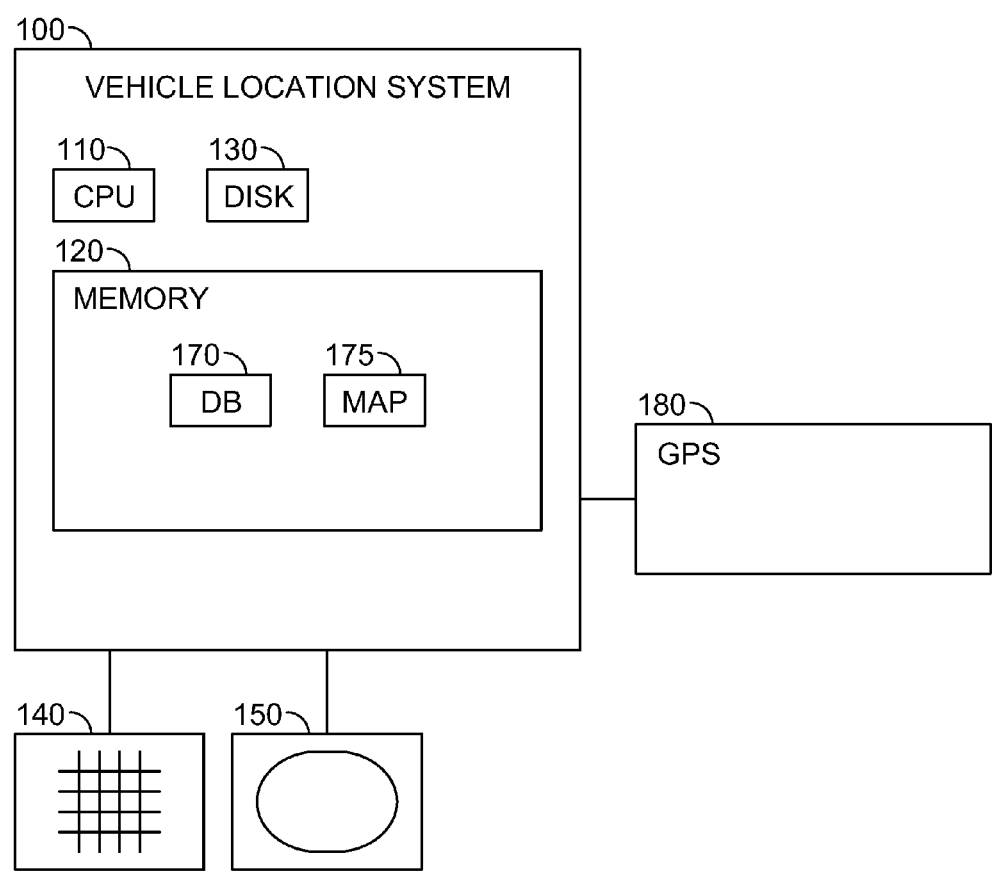
FIG. 2 is a schematic diagram of a vehicle location system according to an embodiment of the present invention.

FIG. 2 is a schematic diagram of a vehicle location system according to an embodiment of the present invention. Vehicle location system 100 may include one or more processor(s) or controller(s) 110, memory 120, long term storage 130, input device(s) or area(s) 140, and output device(s) or area(s) 150. Input device(s) or area(s) 140 may be, for example, a touchscreen, a keyboard, microphone, pointer device, or other device. Output device(s) or area(s) 150 may be for example a display, screen, audio device such as speaker or headphones, or other device. Input device(s) or area(s) 140 and output device(s) or area(s) 150 may be combined into, for example, a touch screen display and input which may be part of system 100. Vehicle location system 100 may include, be associated with, or be connected to GPS system 180, or another system for receiving or determining location information, e.g., for vehicle 10. GPS system 180 may be located in the vehicle 10 in a location separate from system 100.

System 100 may include one or more databases 170, which may include, for example, information on each object (e.g., traffic sign, tree, statue, lane marker, etc.) encountered previously, including the geographic or three-dimensional (3D) location of the object and object geometry information or other object categorization information, and possibly an identifier or index identifier. The geographic or 3D location of an object such as a tree, for example, may be stored in a format or location used in GPS systems, an X, Y, Z coordinate set, or other suitable location information. System 100 may also, based on the sensed object data, categorize the object data by the geometry, shape, appearance, color, texture, or other physical features of the object. For example, if a sensed object shape data measured by a sensor (e.g., LIDAR 20 or camera 24) matches previously stored geometry data for a tree, system 100 may store along with 3D location data, object geometry data categorizing the object as a tree.

Databases 170 may be stored all or partly in one or both of memory 120, long term storage 130, or another device. System 100 may include map data 175, although such data may be accessible remotely and may be stored separately from system 100. Map data may also be stored in database 170. Map data 175 may include the 3D locations, geometric shape, and/or appearance of objects previously measured by vehicle 10.

Processor or controller 110 may be, for example, a central processing unit (CPU), a chip or any suitable computing or computational device. Processor or controller 110 may include multiple processors, and may include general purpose processors and/or dedicated processors such as graphics processing chips. Processor 110 may execute code or instructions, for example stored in memory 120 or long term storage 130, to carry out embodiments of the present invention.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include multiple memory units.

Long term storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit, and may include multiple or a combination of such units.

Memory 120 and/or long term storage 130 and/or other storage devices may store the geometry of the roads, intersections, or other areas to which vehicle 10 has visited, which may include for example the location coordinates (e.g., X/Y/Z coordinates, GPS coordinates) and geometric shape data of static objects 30.

Figure 3:
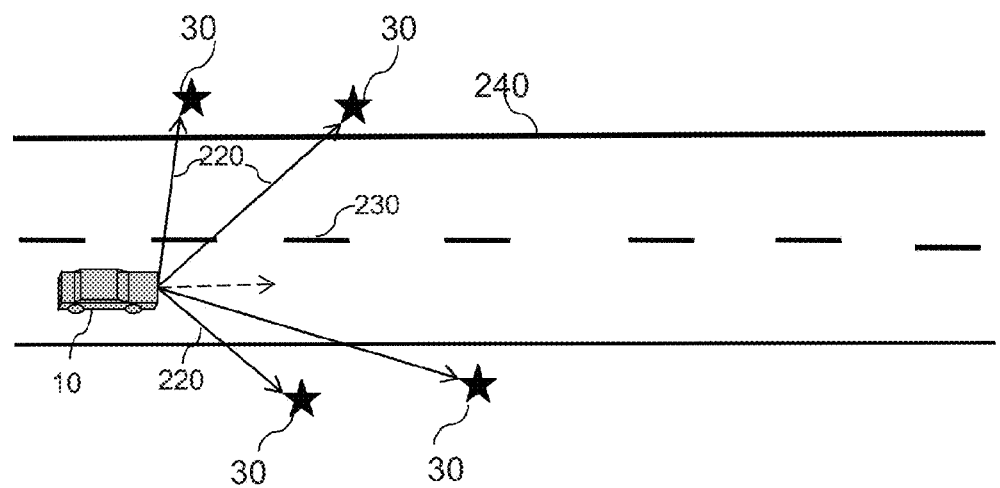
FIG. 3 is a schematic diagram of a vehicle using an object location measurement system according to an embodiment of the present invention.

FIG. 3 is a schematic diagram of a vehicle using an object location measurement system according to an embodiment of the present invention. A vehicle 10 (e.g., a car or other type of vehicle) equipped with a sensor may be stationary or in motion. Vehicle 10 may use sensor(s) 20, 22, 24 to measure the position of an object relative to the vehicle. Relative object or landmark location 220 may represent the relative location of objects 30, lane markers 230, road shoulders 240, or other stationary objects. Relative landmark or object position 220 is the relative geographic position, or location, of object 30 with reference to vehicle 10. Relative object location 220 may be stored as data in vehicle location system 100. In one embodiment, relative object location 220 data may be stored as a vector.

In one embodiment, the sensor(s) may include one or more LIDAR device(s) 20 and/or a radar device(s) 22. LIDAR device 20 and/or radar device 22 may measure the object position with respect to the vehicle and the relative angle between object 30 and vehicle 10. System 100 may use the object position and angle data to determine relative object location 220. LIDAR sensor 20 may measure the geometry (e.g., size and shape) and/or other characteristics of object 30.

In one embodiment, sensors may include a computer vision sensor (e.g., a camera) 24. System 100 may use data sensed by one or more camera(s) 24 to determine relative object location 220 using various methods. For example, a triangulation approach or other method may be used. As vehicle 10 moves in reference to object 30, camera 24 may capture a plurality of images of object 30. System 100 may determine the angle or angles of the line from camera 24 to object 30. System 100 may use the plurality of images and determined angle(s) in a triangulation calculation method to determine relative object location 220. The specific position and angle of view of camera 24 relative to the GPS center point of vehicle 10 may be known and used for such calculations. Camera 24 may provide images and thus the ability to measure (e.g., using processor 110) the visual characteristics or appearance (e.g., texture and color) and/or other characteristics of object 30.

Vehicle location system 100 may retrieve object location, geometry and/or appearance data, for example, collected or measured by vehicle 10 during previous trips. The previously measured object location, geometry, and/or appearance data may be matched to the current sensor measured relative object location 220, sensor measured object geometry, sensor measured object appearance, and/or other sensor measured information. The previously measured object location data may represent the locations of objects with reference to a global map or sub-map coordinate frame. Current sensor measured relative object location 220 may however represent the location of the object with reference to the vehicle coordinate frame. In order to match measured current relative object location 220 to previously measured objection location data, vehicle location system 100 may use a transformation matrix algorithm or other process to transform the measured relative object location 220 measurement to the global or sub-map coordinate frame. Alternatively, the previously measured object location data may be transformed into the vehicle coordinate frame using a transformation matrix algorithm, for purposes of matching. Other methods of coordinate transformation may be used.

By matching relative object location 220, geometry, and appearance to previously stored measurement data, the position of vehicle 10 may be calculated and updated in vehicle location system 100. Vehicle location system 100 may also match relative object location 220 to previously stored measurement data in order to update stored position data representing the location of objects 30, lane dividers 230, edge of the road 240, or other stationary objects.

Figure 4:
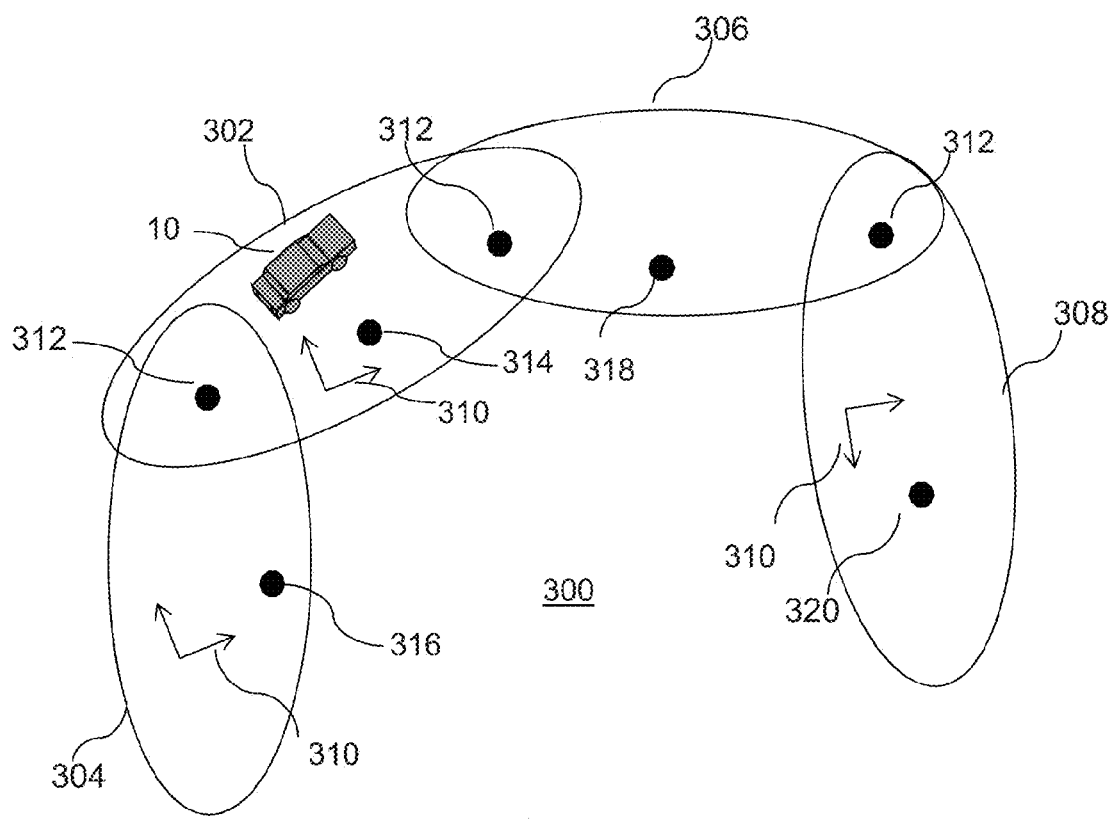
FIG. 4 is a schematic diagram of a vehicle using an object location measurement system according to an embodiment of the present invention.

FIG. 4 is a schematic diagram depicting a vehicle using an object location measurement system according to an embodiment of the present invention. A vehicle trip may be mapped onto large, or global, environmental map 300 of geographic data or information. Global map 300 may represent the geography and/or topography of a portion of the earth including landmarks, objects, previous vehicle position data and other information. In one embodiment, global map 300 is stored as a list of geographic position data (e.g., X/Y/Z coordinates with respect to a reference point such as home or office, GPS coordinates) in a system or database (e.g., database 170). A global map 300 encompassing an entire vehicle trip may span many miles. For example, a global map 300 may cover the route from home to work or any other vehicle route. In a relatively short trip, a sensor 20, 22, 24 may detect thousands of landmarks creating volumes of data that may be too great for system 100, or any computer, to efficiently process relative to a global map 300. Also, the vehicle and landmark position measurements may be determined based on the sensed relative position of the vehicle in reference to the landmark 220. The accuracy of the sensed measurement is higher if object 30 is located closer to vehicle 10. Thus, in order to improve processing times, data storage efficiency, and measurement accuracy in vehicle location system 100, a large map 300 may be divided into a plurality of sub-maps, or local maps 302, 304, 306, 308. A global map 300 may be part of or derived from a conventional map associated with a GPS system.

In one embodiment, sub-maps 302, 304, 306, 308 may be stored as a list of geographic position information (e.g., X/Y/Z coordinates, GPS coordinates) in a system or database (e.g., database 170). Each sub-map may be tied to or referenced by a node in global map 300, and each sub-map may cover a distance of, for example, several hundred meters in each direction. Other sub-map sizes may also be used. The size of each sub-map may be limited by the effective range of sensors 20, 22, 24 associated with vehicle or other factors. For example, the effective range of LIDAR sensor 20, radar sensor 22, and computer vision sensor 24 may range from 80 to 140 meters. Global map 300 in FIG. 4 shows four sub-maps 302, 304, 306, 308, but there may be any number of sub-maps that make up a global map 300.

Each sub-map may include a set of object location data that may include the position of objects with respect to, for example, origin 310 of sub-map 302. It may be determined if a vehicle is in a certain sub-map by, for example, determining the sub-map origin closest to the currently known, estimated, or calculated vehicle position. In one embodiment, the sub-maps are defined by their origins, and the boundaries of sub-maps may be determined by, for example, Voronoi mathematical methods. Other methods of defining sub-maps may be used. Neighboring sub-maps may be found by, for example, finding the Voronoi neighbor space of a sub-map, and determining that sub-maps within this space are neighbors if they share objects or landmarks. A new sub-map may be created when vehicle 10 first travels a new route. For example, a new sub-map may be created if the distance of the vehicle from the origin of the current sub-map is greater than 100 meters, or another threshold. Origin 310 may be an arbitrary point within sub-map 302. Origin 310 may be determined when system 100 creates sub-map 302 or at any other time. When sub-map 302 is created, origin 310 may defined as the point where vehicle 10 is located when sub-map 302 is created. The position of an object 30 relative to the global map 300 or in an absolute sense may be determined by combining the position of the object 30 relative to the sub-map with the position of the sub-map (or the origin of the sub-map) relative to the global map 300.

As vehicle 10 travels through the area represented by sub-map 302, the locations or relative locations (to vehicle 10) of objects 312, 314 within sub-map 302, where the vehicle is located, may be measured using data from one or more sensor(s) 20, 22, 24. One or more LIDAR sensor(s) 20 may also measure the geometry (e.g., size and shape) of objects 312, 314. One or more camera(s) 24 may measure or provide images enabling measurement of the visual characteristics or appearance (e.g., texture and color) of objects 312, 314. Based on the estimated vehicle position in sub-map 302 and the measured relative location of objects 312, 314, the location of objects 312, 314 with respect to origin 310 of sub-map 302 may be calculated. The estimated or calculated location of objects 312, 314 with respect to origin 310 of sub-map 302 may be compared to previously stored object location data to determine if the location of objects 312, 314 matches stored object or landmark data. The geometry (e.g., size and shape) and appearance (e.g., texture and color) of objects 312, 314 may also be compared to previously stored object geometry and appearance data to determine if objects 312, 314 match stored object or landmark data. If the location with respect to origin 310 of sub-map 302, geometry, and/or appearance of objects 312, 314 matches previously stored data, the location of objects 312, 314 with respect to origin 310 of sub-map 302 may be used to update the stored object location data. If the location with respect to origin 310 of sub-map 302, geometry, and/or appearance of objects 312, 314 does not match previously stored data, the stored data may be updated to include the location of objects 312, 314. Based on the location of objects 312, 314 with respect to origin 310 of sub-map 302 and the stored object location data, the updated position of vehicle 10 may be determined.

The location of neighboring, overlapping or adjacent sub-maps may be correlated with reference to each other. A sub-map 302 may overlap an adjacent sub-map 304, 306 and a common landmark 312 (e.g., corresponding to or being an object 30) may exist that can be sensed or measured by a vehicle 10 in each adjacent two or more overlapping sub-maps 302, 304. Common landmark 312 may be used to correlate the locations of adjacent, or neighboring, sub-maps 302, 304 with reference to each other. The location of origins 310 of neighboring sub-maps 302, 304 may be correlated with reference to each other using common landmark 312 as a reference point. Based on the correlated location of sub-map 302 in relation to the adjacent sub-maps 304, 306, position of objects 316, 318, 320 in adjacent sub-maps with respect to origins 310 of sub-maps 304, 306 may also be updated. The correlated location of each sub-map origin 310 with reference to each adjacent sub-map origin 310 may be used to create a global environmental map 300.

According to one embodiment, the location of vehicle 10 and measured objects 30 may be calculated or determined, or estimated or optimized, relative to sub-map 302 using a mathematical modeling technique. The vehicle location and object locations relative to adjacent or neighboring sub-maps 304, 306 may also be calculated using a mathematical modeling technique. The mathematical modeling technique may be a weighted least square mathematical approach, a Bayesian filtering method (e.g., Kalman filtering and particle filtering), or other mathematical approach.

A weighted least square mathematical approach may be used to calculate or estimate the position of the vehicle 10 and measured landmarks 30 relative to a sub-map, or sub-map origin 310, based on previously measured vehicle location data (e.g., GPS data which may have poor accuracy), previously measured landmark location data, dead reckoning position estimation, and sensor measured relative location of a landmark with respect to vehicle 220. In one embodiment, the following formula may be minimized to optimize or refine vehicle location from an initial or estimated vehicle location:

$$\min_{x,f}(\|R_x x_t - z_x\|^2 + \|F_f f - z_f\|^2 +$$
$$\|Fx_t - Gx_{t+1} + u_t\|^2 + \|H_f f' + H_x x_{t+1} - o_{t+1}\|^2)$$

The weighted least square approximation method, one example of which is represented in the equation above, may be used to determine or update the location of vehicle $x_{t+1}$ and measured landmark f' relative to a sub-map. The calculated $x_{t+1}$ and f' values may be approximate, best fit, or minimized solutions to the weighted least square equation. Current vehicle position $x_{t+1}$ and object location f' may be calculated at regular intervals or time steps, or at a predefined update rate. Current vehicle position $x_{t+1}$ and object location f' may, for example, be calculated every 100 milliseconds or at other intervals.

The first term of the equation $\|R_x x_t - z_x\|^2$ represents the contribution of previously recorded vehicle position data, wherein $x_t$ may be vehicle position relative to sub-map 302 calculated just prior to the time of calculation (e.g., a position on the current trip). For example, $x_t$ may have been calculated in the previous interval or time step. The set $x_t:[R_x, z_x]$ may be the prior distribution of vehicle position data recorded during the current vehicle trip. The set $x_t:[R_x, z_x]$ may, for example, be the prior distribution of vehicle position data recorded during the previous time step, wherein $z_x$ may be a vector of previously recorded vehicle positions, and $R_x$ may be the matrix representing the covariance of the recorded vehicle positions $z_x$. Vehicle location $x_t$ may, for example, have been measured 100 milliseconds (or another time) prior to the current time of calculating location of vehicle $x_{t+1}$. Vehicle location $x_t$ may therefore provide a close approximation to the current vehicle location $x_{t+1}$. The $\|R_x x_t - z_x\|^2$ term therefore represents the contribution of the previously measured vehicle positions on the current trip to the weighted least square approximation of the vehicle location $x_{t+1}$ relative to sub-map 302.

The $\|R_f f - z_f\|^2$ term represents the contribution of previous recorded object position data, wherein f may be a previously measured object position relative to sub-map 302. The set f: [$R_f, z_f$] may be the prior distribution of object location data recorded during previous vehicle trips or during the current trip, wherein $z_f$ may be a vector of previously stored object positions, and $R_f$ may be the matrix representing the covariance of the previously recorded object locations $z_f$. The set f: [$R_f, z_f$] may include best estimated object position data from other sources including, but not limited to, GPS data.

The $\|Fx_t - Gx_{t+1} + u_t\|^2$ term may represent the contribution of the dead-reckoning vehicle position calculation. The dead reckoning vehicle position calculation may estimate the location of the vehicle using the dynamic input of the vehicle (e.g., calculations based on data from sensors such as 70, 72, 74, and 76). The matrices F and G are linearization matrices that transform the non-linear vehicle position data $x_t$ and $x_{t+1}$ to a linear data set. The vehicle dynamic input, which may include yaw-rate, longitudinal acceleration, lateral acceleration, velocity or other vehicle dynamics, is represented by the vector $u_t$.

The $\|H_f f + H_x x_{t+1} - o_t\|^2$ term represents the contribution of the relative position of the object to the vehicle as measured by sensors. The matrices $H_f$ and $H_x$ are determined by the geometrical configuration and orientation of sensor(s) 20, 22, 24 associated with vehicle 10. The vector $o_t$ is the sensor-measured position of a landmark with respect to vehicle 220.

Vehicle location system 100 may compute the weighted least square approximation solution values for vehicle position $x_{t+1}$ and object location f' with reference to the sub-map 302. System 100 may also store the vehicle position data $x_{t+1}$ and object location data f' in a database (e.g., memory 120) and provide the data to an enhanced driving application. Other methods of determining or refining a vehicle location using relative location from an object with a known position may be used.

Figure 5:
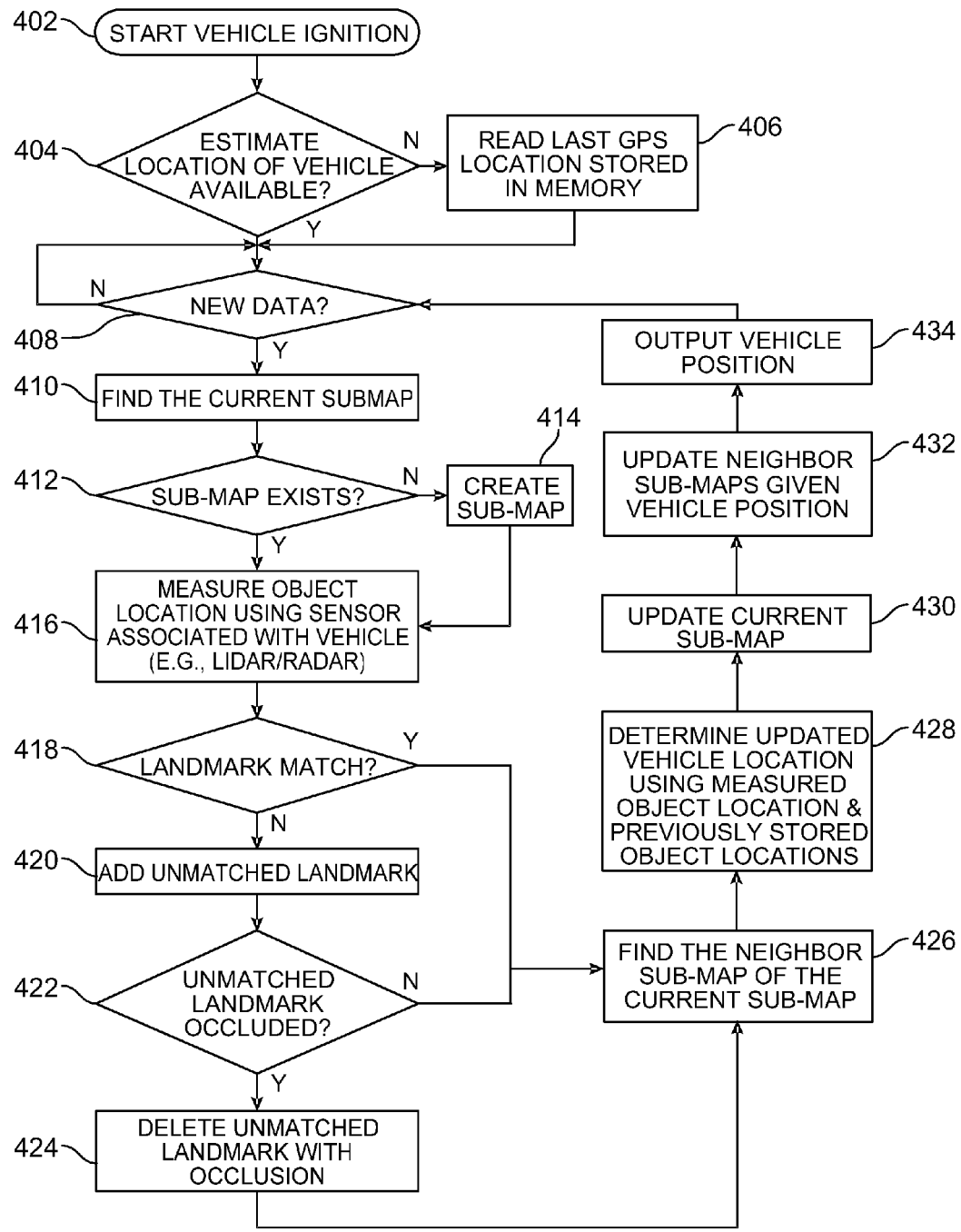
FIG. 5 is a flowchart of a method for measuring object locations to update the position of a vehicle, according to an embodiment of the present invention.

FIG. 5 is a flowchart depicting a method for using object locations to update the position of a vehicle, according to an embodiment of the invention. The operations may be carried out by vehicle location system 100 or by other systems associated with or separate from vehicle 10. As depicted in block 402, the system or process may be initiated when the vehicle ignition is started. As illustrated in block 404, the position of the vehicle may be determined (e.g., via GPS or sensor measurement) by system 100. As illustrated in block 406, if an initial location of the vehicle cannot be determined or calculated by system 100, the last location stored, for example in memory 120, long term storage 130, or other storage devices, may be used. Whether new data, which may include vehicle position, landmark position, vehicle dynamic data (e.g., longitudinal acceleration, lateral acceleration, yaw-rate) and other data, is available may be assessed by system 100, as depicted in block 408. As illustrated in blocks 410 and 412, using the vehicle location data (e.g., GPS data) it may be determined which sub-map corresponds to the current vehicle location. The sub-map that corresponds to the vehicle location may be determined based on one or more of vehicle position, previously stored landmark position data, and the relative position of landmarks with respect to the vehicle. In one embodiment, the sub-map that corresponds to the vehicle location may be determined by measuring the relative distance between the vehicle and one or more sub-map origins 310. The sub-map origin 310 that is closest to vehicle 10 may correspond to the sub-map 302 in which the vehicle 10 is considered to be located.

If it is determined by the system 100 that the vehicle location does not correspond to a location in a previously stored sub-map, a new sub-map is created in the system (e.g., stored in memory 120), as depicted in block 414. A new sub-map may be created when vehicle 10 first travels through a landscape. The first time vehicle 10 is started, system 100 may contain no sub-maps.

Objects may be detected, and an object location relative to the vehicle may be determined, using data from one or more sensors 20 associated with the vehicle, as illustrated in block 416. In one embodiment, only objects of less than a predetermined size (e.g., width or diameter) are measured by the sensors 20, 22, 24. For example, only objects less than 0.5 meters (m) in diameter or width may be measured. In one embodiment, only objects that are further than a predetermined distance from any nearby object are measured by sensor(s) 20, 22, 24. For example, only objects further than 2 meters from the closest object may be tracked. In one embodiment, only objects moving less than a predetermined ground speed relative to the earth are measured by sensor(s) 20, 22, 24. For example, only objects travelling less than 1 m/s may be detected in one embodiment. Objects moving faster than a predefined ground speed may be filtered to ensure that only static objects are registered as landmarks. A slowly moving object however may be, for example, a tree blowing in the wind; therefore, some slow moving objects may be detected. Objects of any size, distance from nearby objects, or ground speed may be detected or measured in other embodiments of the invention.

If object 30 satisfies the size, proximity to other objects, speed, other criteria, it may be determined whether the object matches any of the previously recorded objects in memory 120, long-term storage 130, or other storage devices, as depicted in block 418. Objects may be matched by comparing object coordinate locations, sizes, speed, object shape, object geometry, object color, object texture and other data. If landmark or object 30 does not match any of the previously recorded objects, object 30 may be added to the system memory (e.g., memory block 120), as illustrated in block 420. It may be determined that measured object 30 does not match any previously measured objects because object 30 was occluded or blocked by another stored object (e.g., another car) during a previous measurement. If the object that occluded measured object 30 in the prior measurement is no longer present in subsequent measurements, the occluding object may be deleted from the memory database (e.g., memory 120), as depicted in blocks 422 and block 424.

The object location data or updated location data may be used to locate adjacent, or neighbor, sub-maps 304, 306 with respect to sub-map 302 where vehicle 10 is located, as illustrated in block 426. As illustrated in blocks 428 and 430, after determining neighbor sub-maps 304, 306, the current sub-map 302 object location data and vehicle position in relation to the sub-map 302 may be refreshed, refined, or calculated by system 100. The calculated sub-map object location data and vehicle position may be determined by system 100 using mathematical modeling techniques. One mathematical modeling approach may calculate approximate or best fit object location and vehicle position data with respect to a sub-map based on for example previously measured vehicle location data within the current sub-map, previously measured landmark location data within the current sub-map, dead reckoning calculations, and the relative location of a landmark with respect to vehicle 220. Other methods of determining or refining a vehicle location may be used.

As illustrated in block 432, location of objects 312, 316, 318 located in neighbor sub-maps may be updated with respect to the calculated or refined vehicle position and object locations relative to current sub-map 302. The location of objects 312, 316, 318 may be updated by correlating the location of the neighbor sub-maps 304, 306 to the location of sub-map 302 that corresponds to the vehicle location. The locations of neighbor sub-maps 304, 306 are correlated to current sub-map 302 based on the calculated location of objects 312 that are located in two neighboring sub-maps (e.g., sub-map 302 and sub-map 304).

Vehicle position and object locations may be outputted to a user (e.g., via display) and/or to one or more enhanced driving applications for example, an enhanced object detection system, as depicted in block 434. An enhanced object detection system may use previously stored object locations to construct a map of the road geometry with respect to the previously stored objects. In subsequent vehicle trips on the road, the enhanced object detection system may localize and position vehicle 10 with respect to the road geometry. The enhanced object detection may then only measure objects in the roadway thereby reducing the object detection area and, as a result, speeding up the object detection process. By only measuring objects in the roadway, the number of false object detections will also be reduced.

System 100 may output vehicle and landmark position data to an adaptive front lighting (AFL) application. The AFL application may use the vehicle position and object location data to construct the road surface geometry with respect to previously stored objects. In subsequent vehicle trips on the road, the enhanced object detection system may use the vehicle and object location data to localize and position vehicle 10 with respect to the road geometry. The AFL may then use the localized position of the vehicle with respect to the road geometry to control the direction and heading of the vehicle front headlights, front lamps, fog lights or other illumination device.

System 100 may output vehicle and landmark position information to a traffic light violation alert application. The traffic light violation alert application may utilize the vehicle position and object location data to construct an environmental map of an intersection with respect to previously stored objects. The previously stored objects locations may include traffic lights, lane markers, an intersecting road shoulder, and other landmarks. The traffic light violation alert application may then locate the vehicle with respect to the stored object locations and determine in which lane vehicle 10 is located. Given the accurate position of the vehicle with respect to the lane markers on the road, the traffic light violation alert system may output different commands or alerts based on vehicle's 10 lane position.

System 100 may output vehicle and landmark position information to a forward collision alert (FCA) application. The FCA application may also have a position-aware, or context-aware, threat assessment feature. The FCA may function by alerting the driver, by audible signal, light, or other method, that an object that poses a potential collision threat is located in front of the vehicle. The FCA may use road-side landmark and calculated vehicle position data to suppress collision alert false alarms. An FCA false alarm may occur when the FCA system alerts the driver to a non-existent object in front of the vehicle. The false alarm may be suppressed by storing the location of the object causing the false alarm and the vehicle position at the time of the false alarm. In subsequent vehicle trips, the FCA may, based on the prior recorded vehicle and object location data, identify the false object that caused the false alarm in the previous trip and suppress the false alert.

Figure 6:
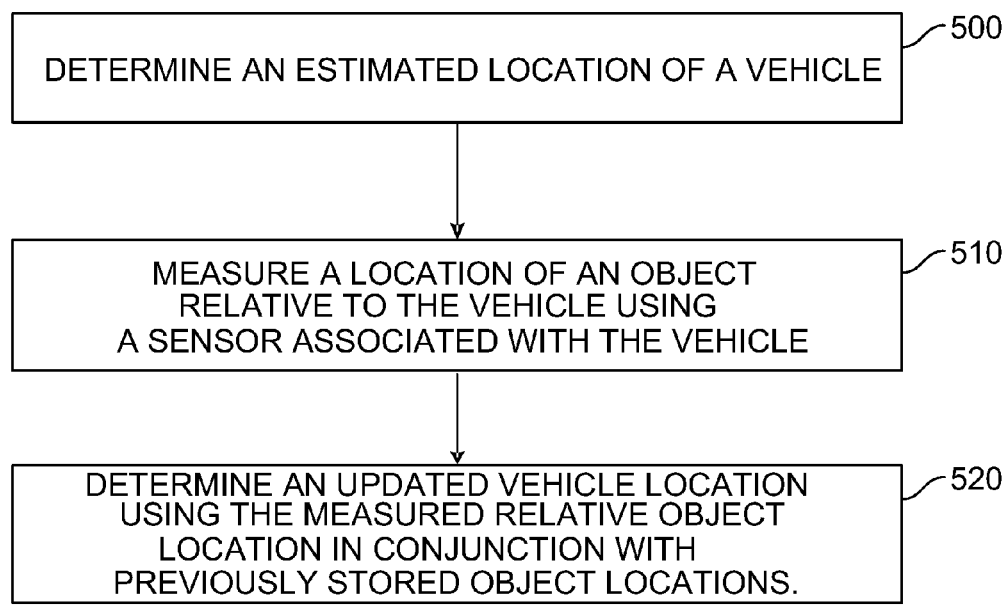
FIG. 6 is a flowchart of a method according to an embodiment of the present invention.

FIG. 6 is a flowchart of a method according to an embodiment of the present invention.

In operation 500, an estimated location of a vehicle may be determined. The estimated location of the vehicle (e.g., vehicle 10 of FIG. 1) may be determined by a sensor or system, for example a GPS system.

In operation 510, a location of an object relative to the vehicle may be calculated or measured using data from a sensor associated with the vehicle (e.g., sensor 20 of FIG. 1). For example, the position of a traffic sign, natural object, or other object may be determined relative to the position of the vehicle using, e.g., image data, LIDAR data, etc. The sensor used in operation 510 may differ from the system or sensor used in step 500.

In operation 520, an updated vehicle location may be determined using the measured object location (e.g., relative object position 220 in FIG. 2) in conjunction with previously stored object locations.

Other operations or series of operations may be used.

Embodiments of the present invention may include apparatuses for performing the operations described herein. Such apparatuses may be specially constructed for the desired purposes, or may include computers or processors selectively activated or reconfigured by a computer program stored in the computers. Such computer programs may be stored in a computer-readable or processor-readable storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Embodiments of the invention may include an article such as a non-transitory computer or processor readable storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Features of various embodiments discussed herein may be used with other embodiments discussed herein. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

The invention claimed is:

1. A method comprising:
   determining an estimated location of a vehicle;
   measuring a location of an object relative to the vehicle using a sensor associated with the vehicle, wherein the measured relative object location includes the object's angle from the vehicle;
   determining an updated vehicle location corresponding to a current sub-map using the measured relative object location in conjunction with previously stored object locations, wherein each of the previously stored object locations is measured relative to an origin of a sub-map, wherein the sub-map overlaps at least one adjacent sub-map by a common landmark;

correlating the origin of the current sub-map and the origin of at least one adjacent sub-map using the common landmark as a reference point; and updating a location of another object in the adjacent sub-map based on the correlation of the current sub-map and the adjacent sub-map.

2. The method of claim 1, wherein the estimated location is determined using a system different from that associated with the sensor.

3. The method of claim 1, comprising determining, using the estimated location of the vehicle, which of a plurality of sub-maps the vehicle location corresponds to.

4. The method of claim 1, comprising determining the updated vehicle location by determining the location of the vehicle relative to the previously stored object location.

5. The method of claim 1, comprising updating an object location using the relative object location in conjunction with the previously stored object locations.

6. The method of claim 1, wherein a least square mathematical approach is used to update the estimated vehicle location.

7. The method of claim 1, wherein the location of the vehicle is determined relative to a global environmental map divided into a plurality of sub-maps.

8. A system comprising:

a database storing previously collected information on the location of objects, wherein each of the object locations is determined relative to an origin of a sub-map, wherein the sub-map overlaps at least one adjacent sub-map by a common landmark and wherein the origin of the sub-map and the origin of at least one adjacent sub-map are correlated using the common landmark as a reference point;

a vehicle location detection system;

a sensor;

a controller to:

determine an estimated location of a vehicle from the vehicle location detection system;

measure the location of an object relative to the vehicle using the sensor, wherein the measured relative object location includes the object's angle from the vehicle;

determine an updated vehicle location corresponding to a current sub-map using the measured relative object location in conjunction with the previously stored object locations; and update a location of another object in the adjacent sub-map based on the correlation of the current sub-map and the adjacent sub-map.

9. The system of claim 8, wherein the controller is to determine the estimated location of the vehicle using a system different from that associated with the sensor.

10. The system of claim 8, wherein the controller is to determine, using the estimated location of the vehicle, which of a plurality of sub-maps the vehicle location corresponds to.

11. The system of claim 8, wherein the controller is to determine the updated vehicle location by determining the location of the vehicle relative to the previously stored object location.

12. The system of claim 8, wherein the controller is to update an object location using the relative object location in conjunction with the previously stored object locations.

13. The system of claim 8, wherein the controller is to determine the updated vehicle location using a least square mathematical approach.

14. The system of claim 8, wherein the controller is to determine the location of the vehicle relative to a global environmental map divided into a plurality of sub-maps.

15. A method comprising:

in a vehicle, evaluating a geographic position of a landmark relative to a position of the vehicle using a sensor associated with the vehicle, wherein the landmark position is evaluated relative to an origin of a current sub-map, the current sub-map overlapping at least one adjacent sub-map by a common landmark, wherein the origin of the current sub-map and the origin of at least one adjacent sub-map are correlated using the common landmark as a reference point;

calculating a geographic position of the vehicle using the evaluated landmark positionz and updating a location of an object in the adjacent sub-map based on the correlation of the current sub-map and the adjacent sub-map.

16. The method of claim 15, comprising evaluating, using the calculated position of the vehicle, which of a plurality of sub-maps the vehicle position corresponds to.

17. The method of claim 15, comprising calculating the geographic position of the vehicle by calculating the position of the vehicle relative to the evaluated landmark position.

18. The method of claim 15, comprising updating a landmark position using the evaluated landmark position in conjunction with a plurality of previously detected landmark positions.

19. The method of claim 15, wherein a least square mathematical approach is used to calculate the position of the vehicle.

20. The method of claim 15, wherein the position of the vehicle is calculated in reference to a global environmental map divided into a plurality of sub-maps.

* * * * *